United States Patent [19]
Montalbano

[11] Patent Number: 5,628,905
[45] Date of Patent: May 13, 1997

[54] BIOLOGICAL AQUARIUM FILTER WITH MEANS TO KEEP THE SIPHON TUBES PRIMED

[76] Inventor: Gregory Montalbano, 86 Harrisburg St., Bayshore, N.Y. 11706

[21] Appl. No.: 416,132

[22] Filed: Apr. 4, 1995

[51] Int. Cl.$^6$ ................................................. A01K 63/04
[52] U.S. Cl. .................. 210/615; 210/622; 210/703; 210/806; 210/169; 210/416.2; 210/150; 210/151; 210/221.1; 119/260
[58] Field of Search .................... 210/169, 416.2, 210/150, 151, 221.1, 221.2, 703, 615, 620, 621, 622, 806; 119/259, 260, 261

[56] References Cited

U.S. PATENT DOCUMENTS

| | | |
|---|---|---|
| 3,616,919 | 11/1971 | Feddern ................................ 210/169 |
| 3,738,494 | 6/1973 | Willinger et al. .................... 210/169 |
| 3,768,652 | 10/1973 | Jardim .................................. 210/169 |
| 3,835,813 | 9/1974 | Katz .................................... 210/169 |
| 4,220,530 | 9/1980 | Gabriele . |
| 4,851,112 | 7/1989 | Schlensker . |
| 4,988,436 | 1/1991 | Cole . |
| 5,006,230 | 4/1991 | Votava, III et al. . |
| 5,078,867 | 1/1992 | Danner . |
| 5,084,164 | 1/1992 | Del Rosario . |
| 5,171,438 | 12/1992 | Korcz . |
| 5,176,824 | 1/1993 | Willinger et al. . |
| 5,234,581 | 8/1993 | Rosenberg . |
| 5,242,582 | 9/1993 | Marioni . |
| 5,266,190 | 11/1993 | Tominga . |
| 5,282,962 | 2/1994 | Chen . |
| 5,306,421 | 4/1994 | Weinstein . |

*Primary Examiner*—Robert J. Popovics
*Attorney, Agent, or Firm*—Cobrin Gittes & Samuel

[57] ABSTRACT

A filtration apparatus for an aquarium comprising of mechanical, biological and chemical filter mechanisms for removing impurities from water and an intake tube/pre-filter arrangement for maintaining syphonability of the apparatus during both operating and non-operating states. In an another embodiment, a protein skimmer is combined with the other filter mechanisms.

14 Claims, 6 Drawing Sheets

BIOLOGICAL AQUARIUM FILTER WITH MEANS TO KEEP THE SIPHON TUBES PRIMED

FIELD OF THE INVENTION

The present invention relates generally to the field of filtration systems for aquariums of any size. More specifically, the present invention relates to a highly simplified, efficient, and self-contained wet/dry filtration system and method.

BACKGROUND OF THE INVENTION

Filtration systems are used to remove impurities—including suspended solids (such as fish feces and uneaten food) and liquids (such as dissolved protein and ammonia from urea)—which contaminate the aquarium environment. Such impurities affect the chemical balance of the aquarium water, which in turn determines the frequency with which the water must be changed.

Ammonia is produced through fish excretions. Additionally, ammonia is the end product of decaying organic matter, such as uneaten food, dead fish and feces. Ammonia is conventionally removed from an aquarium through a process called "nitrification," which requires the presence of two different types of bacteria, referred to as nitriflers or nitrifying bacteria. Such bacteria flourish in both aerobic and anaerobic settings.

Bacteria of the type nitrosomonas first converts the ammonia to nitrite in the aerobic setting. Although nitrite is generally less toxic than ammonia, the removal of ammonia still does not provide adequate purification of the water. Hence, a bacteria of the nitrobacter type acts on the nitrite and converts it further to nitrate, which is harmless to the aquarium environment. Anaerobic bacteria then converts the nitrate to nitrogen gas, which is released into the atmosphere.

Numerous apparatuses for filtering and treating aquarium water have been developed. Among these, a variety of mechanical filters are disclosed in the prior art. With these systems, aquarium water generally passes through one or a series of mechanical filters which trap particulate impurities. Such mechanical filters may comprise layers of gravel, sand, groundstone, coral, and the like. Additionally, filter pads made of a porous, fibrous or water permeable material are used. Biological filters which utilize helpful bacteria to convert ammonia to less toxic forms are also known in the prior art. Moreover, chemical filters which remove or deactivate organics and any substance containing the element carbon appear in the prior art. Such filters, generally, use activated carbon and ion exchange resins.

Protein skimmers have also been used to control the level of toxic compounds in aquariums by foam removal of dissolved protein compounds from the water. Using this approach, water flows in the presence of a stream of air bubbles, whereby the dissolved impurities may attach themselves to, and be carried along with, the bubbles. When the bubbles reach the surface of the water, the impurities collect as a foam, and may be skimmed off.

Despite these advances, prior art filtration apparatuses suffer from a number of deficiencies. For example, many prior art systems do not provide for readily accessible maintenance. The configuration of the bio-junction filtration apparatus permits the maintenance to be an uncomplicated and quick process.

Accordingly, one object of the present invention is to provide a more efficient mechanical/chemical/biological filtration apparatus to remove toxic compounds from aquarium water in order to prevent harm to the captive aquatic life maintained in the aquarium.

Another object of the invention is to provide an improved filtration apparatus, which provides improved foam separation for removing proteins, colloids and soluble high molecular weight compounds from aquarium water, and allows more contact time between the air bubbles with the water.

Yet another object of the invention is to provide greater surface area for biological filtration of the water.

Still another object of the invention is to provide a pre-filter, which is located within the filtration apparatus, to maintain the syphonability of the filtration apparatus.

Additional objects, features and advantages of the present invention will be apparent to those skilled in the art, in light of the written description which follows.

SUMMARY OF THE INVENTION

The present invention provides a simplified, easy to use and highly efficient wet/dry filtration system for use with an aquarium. Additionally, the filtration apparatus is compact in design, inexpensive to manufacture, and reliable in operation.

In accordance with one aspect of the invention, a filtration apparatus for filtering the water in an aquarium comprising a housing attachable to a peripheral wall of the aquarium, an intake tube having an inlet and outlet, the inlet extending into and drawing water from the aquarium, and the outlet extending into a pre-filter, a spray plate receiving water from said pre-filter, a biological chamber receiving water from the spray plate and having a medium for supporting bacteria growth, and a pump for pumping water from the biological chamber to the aquarium. The pre-filter comprises a chamber adapted to maintain siphonability of water through the intake tube during both operating and non-operating states.

The filtration apparatus preferably comprises a self-contained system including mechanical, biological and chemical filter mechanisms to remove impurities from the aquarium water. Although the filtration apparatus is smaller than a conventional wet/dry filter, its configuration permits it to process water at a volumetric flow rate significantly higher than that of traditional filter devices.

Unlike many traditional wet/dry filters, which are positioned within the aquarium, the filtration apparatus of the present invention is preferably positioned outside the aquarium, so as to provide enhanced visual space. Moreover, since the filtration apparatus is preferably attached to a peripheral wall of the aquarium, rather than being positioned below or within the water tank, the user does not need to resort to his/her hands or knees to perform routine maintenance. Additionally, the fact that a pre-filter is located within the bio-junction filtration apparatus rather than within the aquarium, allows for more visual space within the aquarium.

Moreover, the invention preferably includes a pre-filter situated inside the filtration apparatus, rather than within the aquarium, which advantageously provides additional viewing area inside the aquarium. Furthermore, use of the pre-filter, in accordance with the present invention, allows syphonability to be maintained during routine maintenance of the apparatus. The requirement for manned supervision or an expensive system to regulate the water is eliminated.

Unlike traditional surface skimmers, which utilize a pre-filter box located within the aquarium, the filtration apparatus of the present invention preferably employs syphon tubes to draw in water from the aquarium. The use of syphon tubes, in accordance with the invention, permits water to be drawn from lower depths of the aquarium. Hence, the pre-filter will be subjected to less particulate matter, such as fish food.

In accordance with the invention, the pre-filter preferably comprises three chambers: (i) intake chamber, (ii) intermediate chamber, and (iii) outlet chamber. Water is drawn through intake tubes whose inlet is located beneath the surface water of the aquarium and whose outlet is located within the intake chamber. Advantageously, the outlet remains beneath the water level of the intake chamber in order to maintain syphonability.

Water travels beneath and above partition walls within the pre-filter. The bottom wall of the outlet chamber preferably contains apertures through which water flows onto a spray plate. A spray plate, which likewise has a plurality of apertures, distributes water to a biological chamber.

The filtration apparatus of the invention preferably includes a pump which draws the water from the biological chamber into a pump chamber; thereafter, the water returns to the aquarium via a water return tube. In accordance with a preferred embodiment of the invention, a protein skimmer, isolated from the other filtration mechanisms of the invention, communicates with the pump via a venturi, through which water is directed into the protein skimmer's cylinder. The venturi offers the advantage of diverting water into the protein skimmer, wherein the water mixes with air bubbles supplied by an external air pump via an air tube to a woodstone. Highly proteinaceous, and other organic solvent materials, coat the bubbles as they float to the top of the protein skimmer. Organic waste matter is deposited in an impurities collector. A water return tube returns the purified water from the protein skimmer back into the aquarium.

In accordance with another aspect of the invention, a method of filtering water in an aquarium comprises the steps of directing water from the aquarium into an intake tube, directing water from the intake tube into a pre-filter, maintaining syphonability through the intake tube, directing water from the pre-filter onto a spray plate, directing water from the spray plate into a biological chamber, directing water from the biological chamber into a pump, and directing water from the pump to the aquarium.

BRIEF DESCRIPTION OF THE DRAWINGS

The present invention, as described generally above, is described below in reference to a presently-preferred embodiment, which description is intended to be read in conjunction with the following set of drawings, in which.

DESCRIPTION OF THE PREFERRED EMBODIMENTS

Figure 1:
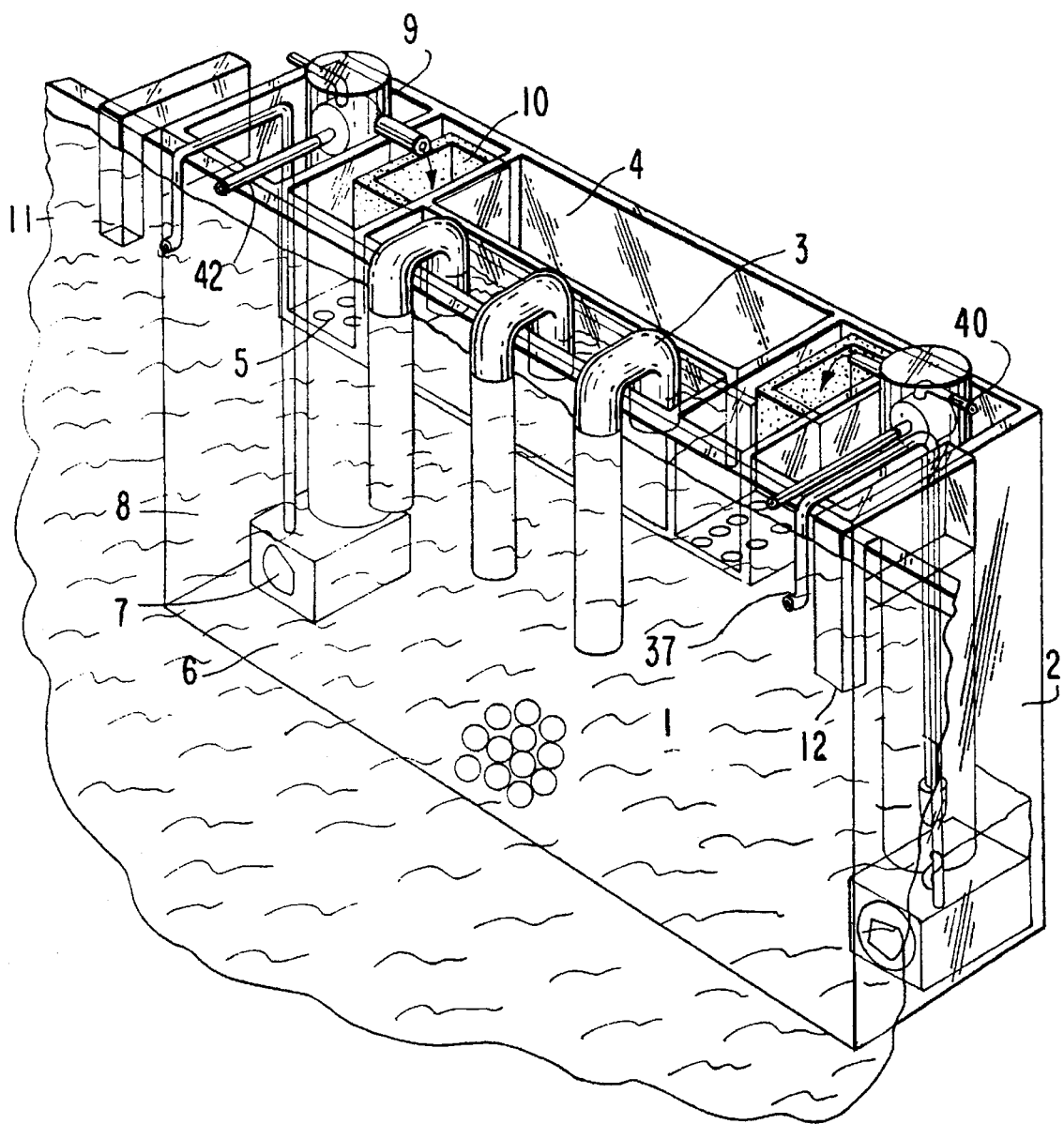
FIG. 1 is a prospective view of a preferred embodiment of the filtration apparatus.

With reference to FIG. 1, filtration apparatus 1 comprises a housing 2, an intake flow tube(s) 3, a pre-filter 4, a spray plate 5, a biological chamber 6, a pump 7, a pump chamber 8, a protein skimmer 9, an impurities collector 10, and a water return tube 11.

With reference to FIGS. 1–4, filtration apparatus 1 is affixed to the aquarium through use of brackets 12, which are preferably formed of an acrylic plastic. Brackets 12 extend over and around an edge of a front wall of the aquarium so that filtration apparatus 1 may be securely hung thereon. Brackets 12 may be attached to filtration apparatus 1 through use of acrylic cement and silicone reinforcement.

The housing 2 of filtration apparatus I preferably has a substantially rectangular configuration, including a front wall 13, side walls 14 and 15, a rear wall 16, a bottom wall 17, and intermediary walls 18 and 19 (collectively, the "housing walls"), which separate biological chamber 6 from the pump chamber 8. The housing walls are preferably formed of a transparent acrylic plastic. Intermediary walls 18 and 19, having upper edges even with the upper edges of the remaining housing walls, extend from front wall 13 to rear wall 16. The lower edges of the intermediary walls 18 and 19 are vertically spaced from bottom wall 17 and, with the adjacent portions of front wall 13 and rear wall 16, define a passageway 20.

Figure 2:
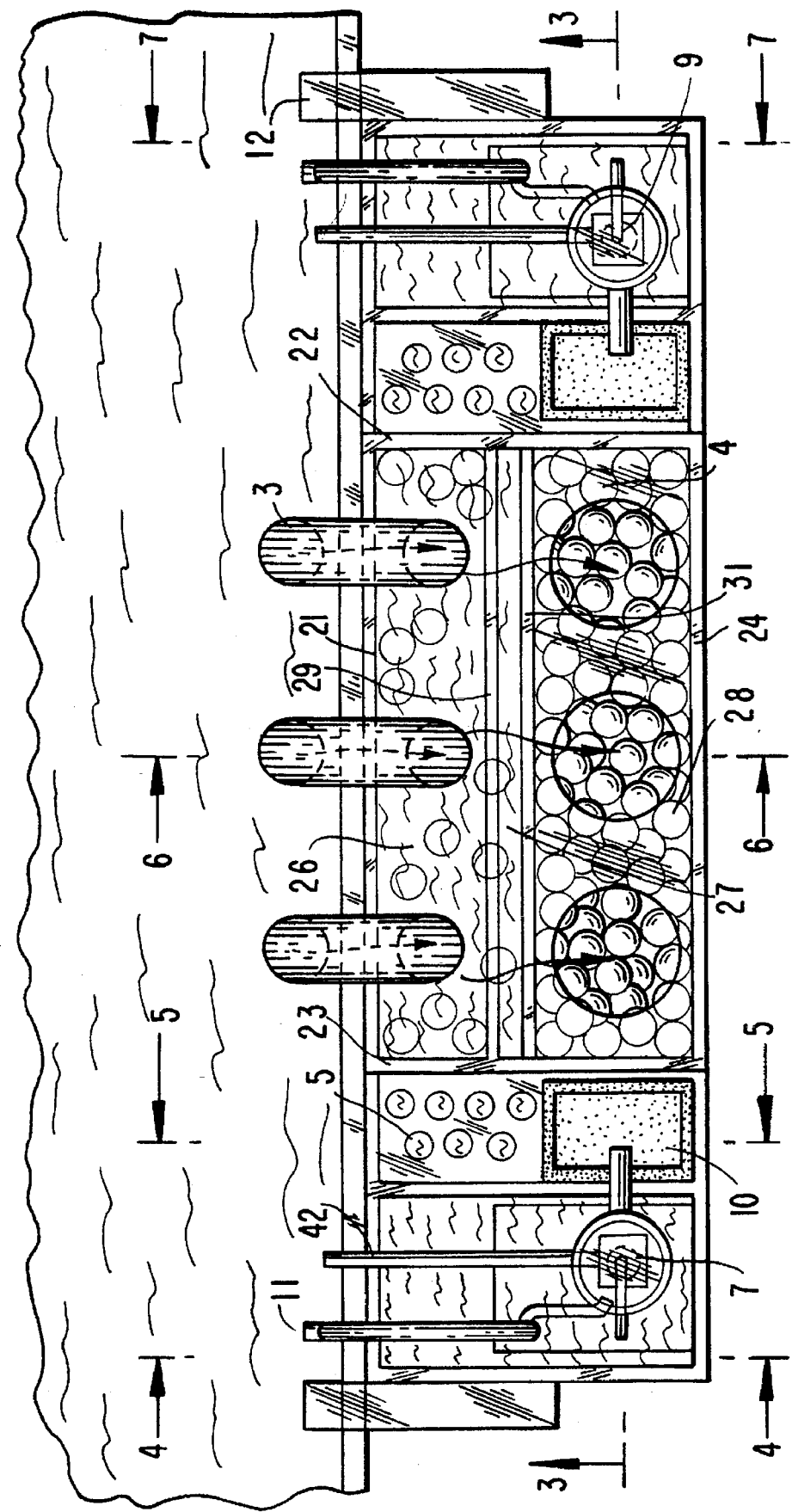
FIG. 2 is a top view of a preferred embodiment of the filtration apparatus.
Figure 3:
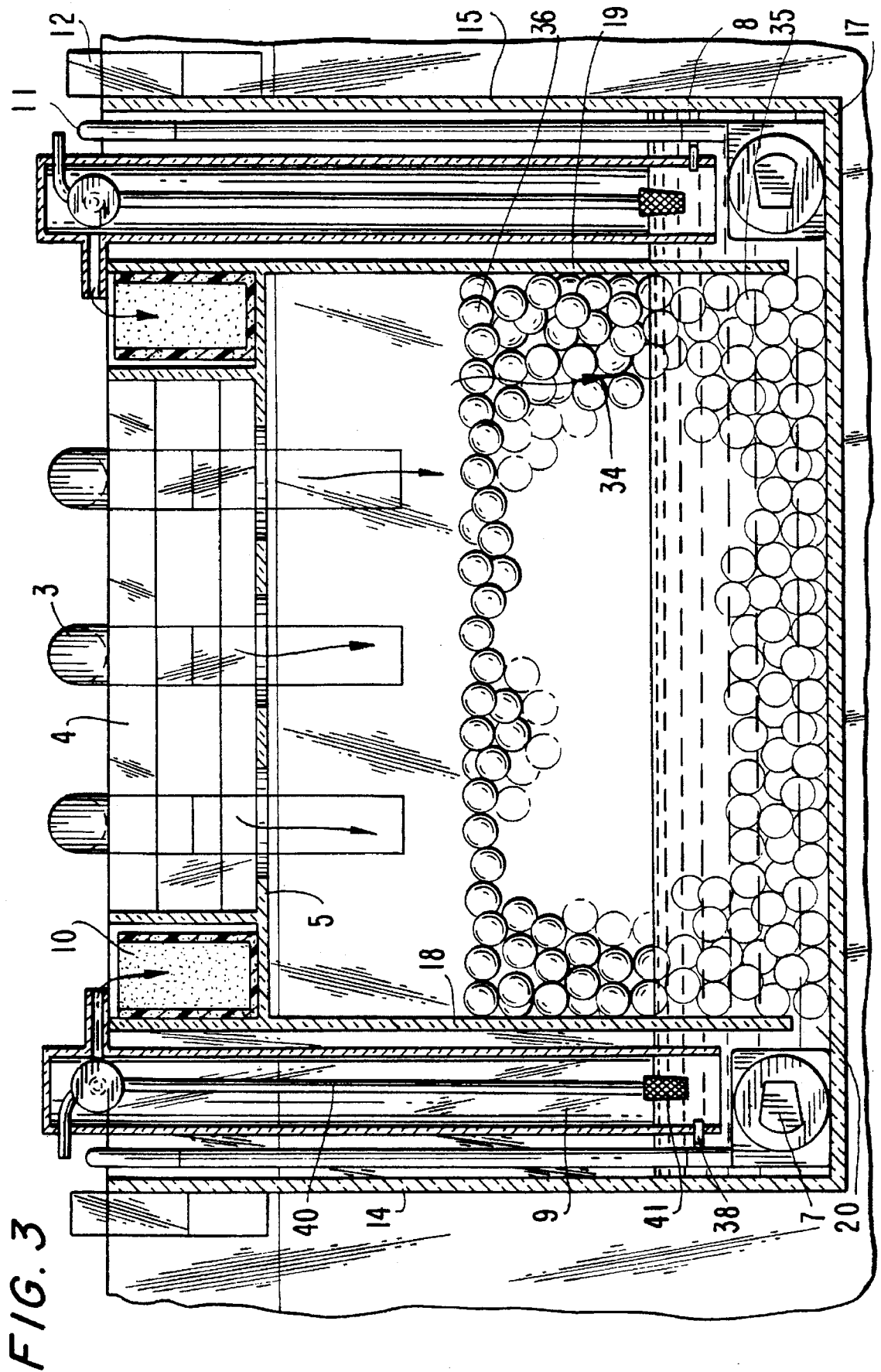
FIG. 3 is a cross-sectional front view of a preferred embodiment of the filtration apparatus as delineated by line 3—3 in FIG. 2.

With reference to FIGS. 1–3, filtration apparatus 1 communicates with the aquarium via intake tube(s) 3, which is/are preferably formed of a resilient plastic material. The number of intake tube(s) 3 may vary according to the required flow rate of water into pre-filter 4.

In contrast to surface skimmers which draw surface water, filtration apparatus 1 siphons water from the mid-depth of the aquarium. Since such water is substantially free of fish food which drifts on the water surface, pre-filter 4 is less exposed to particulate matter. Accordingly, the maintenance of the filtration apparatus 1 is performed less frequently than with a surface skimmer. Moreover, when a filter mechanism (e.g., a mechanical, chemical or biological filter) becomes saturated with particulate matter, water flow within the apparatus is impeded. Hence, if maintenance is not performed on a periodic basis, the pump of a surface skimmer will be required to operate at a sufficiently higher output in order to draw the water through the filter mechanism.

Figure 6:
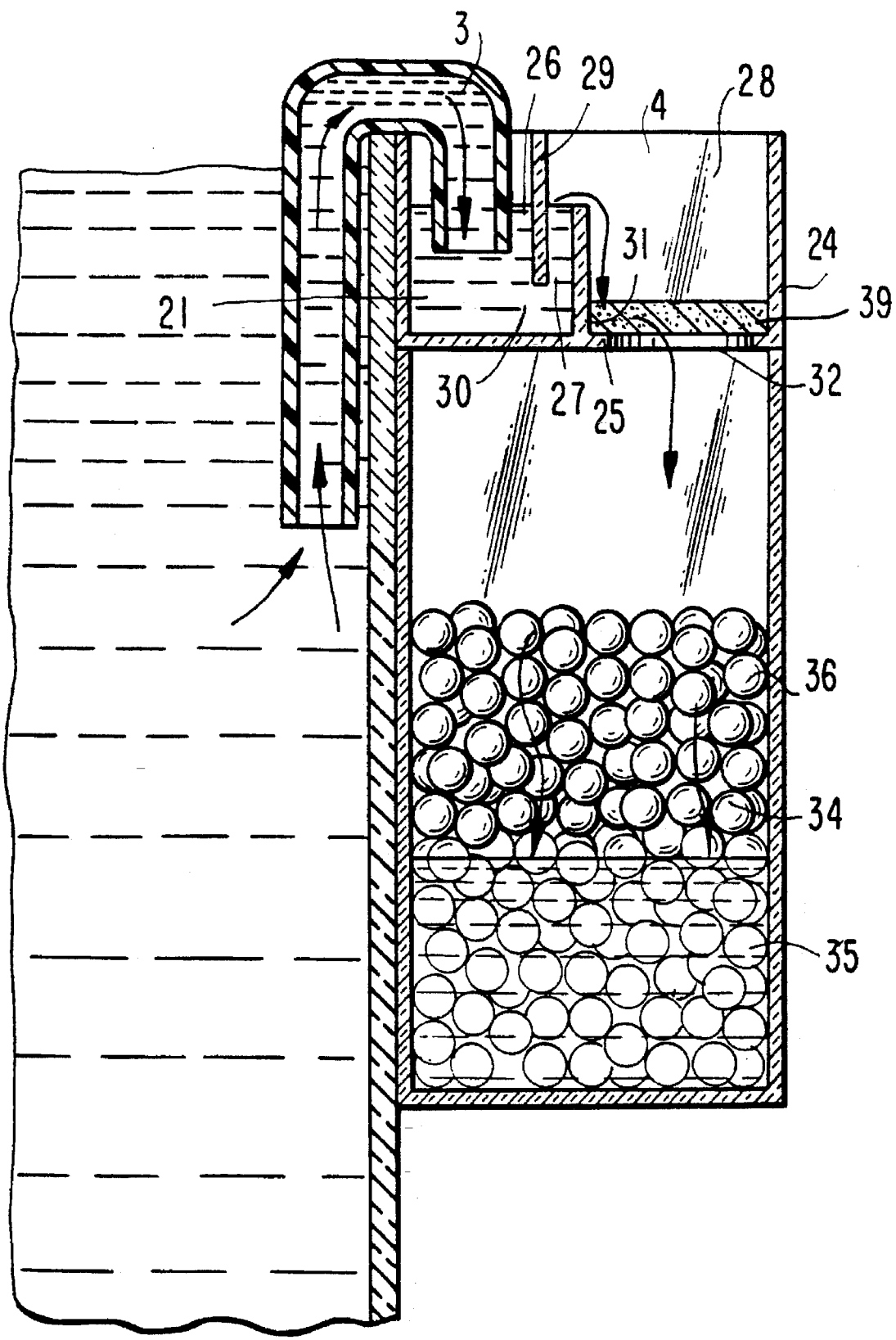
FIG. 6 is a cross-sectional side view of a preferred embodiment of the filtration apparatus isolating the intake tube, the pre-filter, and the biological chamber as delineated by line 6—6 in FIG. 2.

With reference to FIGS. 1–2 and 6, water exits the intake tube(s) 3 into the pre-filter 4. Pre-filter 4 preferably has a substantially rectangular configuration, including a front wall 21, side walls 22 and 23, a rear wall 24, and a bottom wall 25 (collectively, the "pre-filter walls"). Pre-filter 4 comprises three compartments: (i.) intake chamber 26, (ii) intermediate chamber 27, and (iii) outlet chamber 28. The pre-filter walls are preferably formed of acrylic plastic. In a preferred embodiment of the invention, pre-filter 4 is removable for easy maintenance.

An intake chamber 26 is defined by front wall 21, side walls 22–23, and a primary partition wall 29 opposing and spaced from front wall 21 of pre-filter 4. Primary partition wall 29, having its upper edge even with the upper edges of the pre-filter walls, extends from side wall 22 to side wall 23. The lower edge of primary partition wall 29 is vertically spaced from bottom wall 25 and, with the adjacent portions of side walls 22, 23 defines a passageway 30. The lateral edges of the primary partition wall 29 are connected integrally with the interior sides of side walls 22, 23.

Intermediate chamber 27 is defined by primary partition wall 29, side walls 22–23, bottom wall 25, and a secondary partition wall 31 opposing and spaced from primary partition wall 29. Secondary partition wall 31, having its lower edge connected to and abutted against bottom wall 25, extends from side wall 22 to side wall 23. The upper edge of secondary partition wall 31 preferably terminates at a height which is two-thirds (⅔) the height of side walls 22–23. The lateral edges of the secondary partition wall 31 are connected integrally with the interior sides of side walls 22–23.

Outlet chamber 28 is defined by side walls 22–23, rear wall 24, bottom wall 25 and secondary partition wall 31. Bottom wall 25 of the outlet chamber 28 contains apertures 32, which direct the water toward biological chamber 6.

With reference to FIG. 6, water remains in intake chamber 26 during the operation and the non-operation modes of filtration apparatus 1. The outlet of intake tube(s) 3 is positioned beneath the water level in intake chamber 26 during both modes in order to maintain syphonability.

When filtration apparatus 1 is in the non-operation mode, the water level within intermediate chamber 27 remains at the height of secondary partition wall 31. By operating filtration apparatus 1, the water in intake chamber 26 flows beneath primary partition wall 29 and into intermediate chamber 27, wherein the water rises and overflows secondary partition wall 31 into outlet chamber 28.

A chemical filter is preferably placed on the bottom wall 25 of intake chamber 26. The chemical filter may be in the form of peatmoss or an envelope which contains activated carbon to remove or deactivate organic waste. In contrast, traditional filter devices contain chemical filters within the sump of the device, which is not as readily accessible for maintenance and/or removal.

A mechanical filter, 39, shown in FIG. 6, is preferably placed in outlet chamber 28. The mechanical filter may comprise a fluffy mass of synthetic resin which traps particulate matter. Traditional devices, in contrast, perform mechanical filtration after the water has passed through a biological chamber. Advantageously, positioning a mechanical filter before biological chamber 6, helps prevent blockage by biological media within chamber 6. Such blockage would impede water flow within biological chamber 6 and, consequently, reduce the efficiency of filtration apparatus 1.

Figure 5:
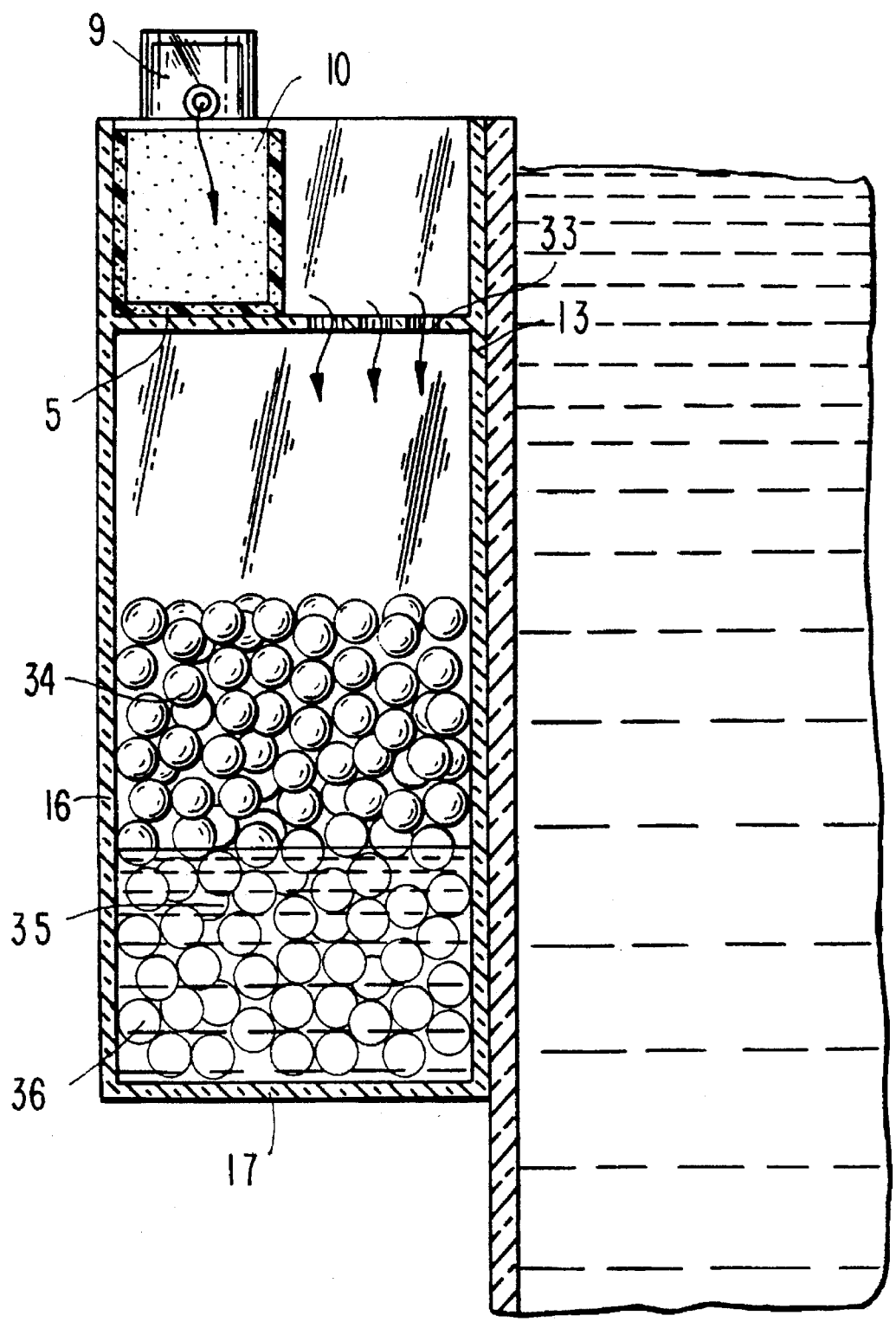
FIG. 5 is a cross-sectional side view of a preferred embodiment of the filtration apparatus isolating the impurities collector and biological chamber as delineated by line 5—5 in FIG. 2.

With reference to FIGS. 2–3 and 5, water exits outlet chamber 28 onto spray plate 5. Spray plate 5 is positioned beneath pre-filter 4 and above biological chamber 6. Spray plate 5 rests on front wall 13, rear wall 16, and intermediary walls 18–19 of housing 2. Spray plate 5 has a plurality of apertures 33 which control the rate of water flow into biological chamber 6, which is defined by front wall 13, rear wall 16, and intermediary walls 18–19 of housing 2. Biological chamber 6 is comprised of an aerobic chamber 34 and an anaerobic chamber 35, both of which preferably contain a biological media 36 for promoting the growth of bacteria.

Biological media 36 should provide a large surface area to which bacteria can attach and, in the case of aerobic bacteria, should provide for the easy flow of air to oxygenate the bacteria. One such material, as shown in FIGS. 3 and 5, is "bio-balls" 36. In contrast to other biological filters, "bio-balls" 36 do not impede water flow. Additionally, the unique design of "bio-balls" 36 provides for high biological mass and density in a relatively small area.

Figure 4:
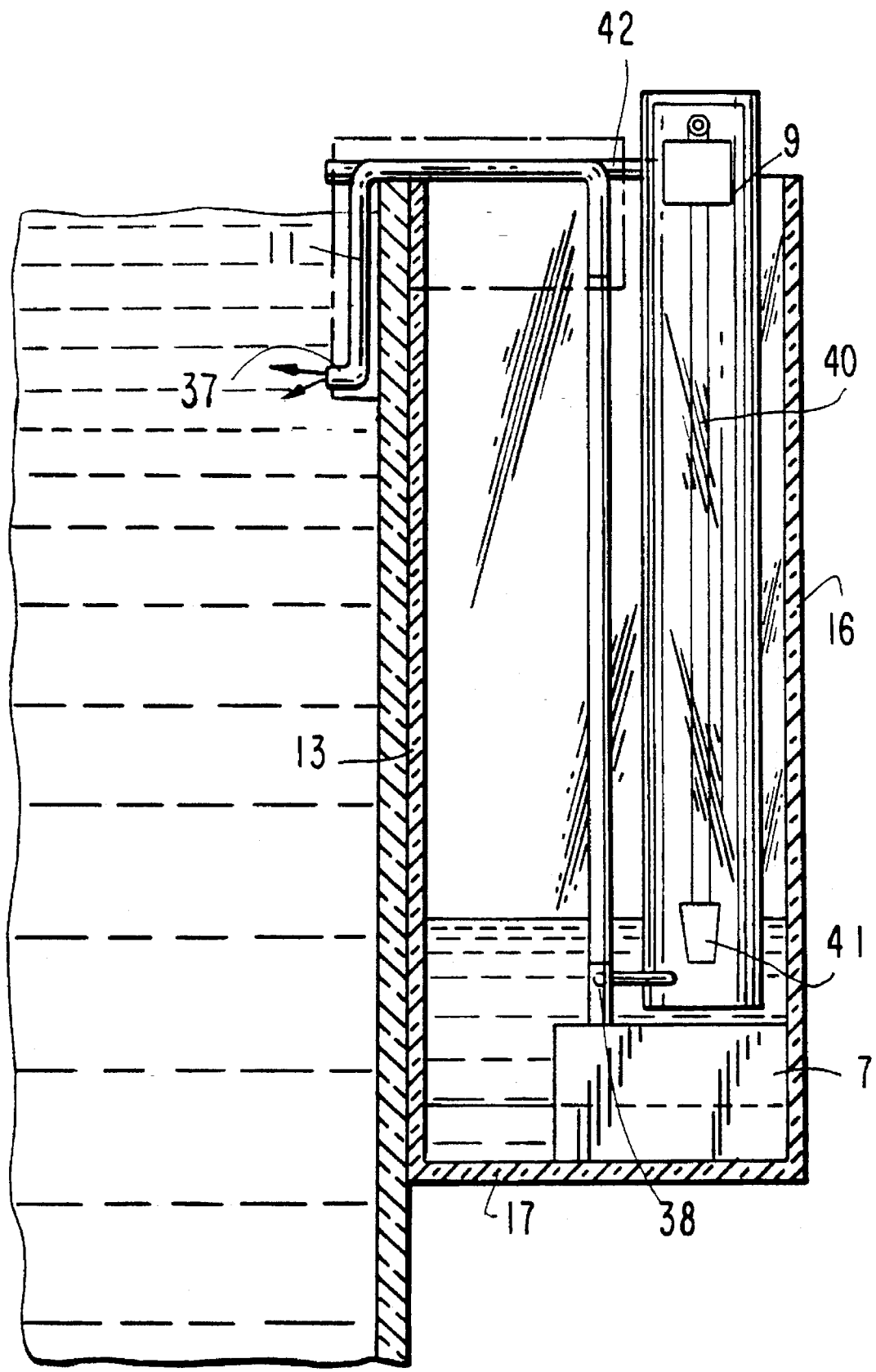
FIG. 4 is a cross-sectional side view of a preferred embodiment of the filtration apparatus isolating the protein skimmer as delineated by line 4—4 in FIG. 2.

With reference to FIGS. 1 and 3–4, water, after being bacteriologically filtered in aerobic chamber 34 and in anaerobic chamber 35, is drawn into pump chamber 8, which is defined by front wall 13, side walls 14–15, rear wall 16, bottom wall 17, and intermediary walls 18–19 of housing 2.

Water is drawn through passageway 20 and into pump chamber 8 by the operation of a pump 7, which is of a water-air mixing type. Water is then pumped via a water return tube 11, having a nozzle 37 with an upward curvature, back into the aquarium. The curvature of nozzle 37 increases the agitation of the water surface. Water return tube 11 is preferably comprised of a plastic or similar non-corrosive material.

With reference to FIG. 4, pump 7 diverts a portion of the water into protein skimmer 9 via a venturi 38, which extends from pump 7. The filtration apparatus 1 is innovational in its use of pump 7 to supply protein skimmer 9 with water, thus providing for greater efficiency of available power. The water which is diverted into protein skimmer 9 flows at a relatively slow rate. This allows for increased contact time with air bubbles, thereby increasing the foam floatation separation of waste froth in protein skimmer 9.

As best seen in FIGS. 1 and 4, protein skimmer 9, being vertically mounted within housing 2, is comprised of a hollow cylinder 39, an air flow tube 40, a woodstone block 41 and a secondary water return tube 42. In a preferred embodiment of the invention, protein skimmer 9 is removable for easy maintenance.

The components of protein skimmer 9 are preferably formed of a transparent plastic material so that the interior of skimmer 9 may be viewed immediately to check the extent of accumulation of the impurities.

Woodstone block 41 communicates with an external air pump (not shown) via air flow tube 40, which is inserted through an opening at the top of cylinder 39. Woodstone block 41 divides the flow of air into many minute bubbles. The rate of air flow is regulated through an air valve (not shown). Highly proteinaceous, and other organic solvent materials, coat the bubbles as they float to the top of protein skimmer 9. Organic waste matter is deposited into impurities collector 10, which is manually emptied. Secondary water return tube 42 returns the purified water back into the aquarium.

With reference to FIG. 1, filtration apparatus I isolates protein skimmer 9 from other filter mechanisms (e.g., mechanical, chemical, biological). By positioning protein skimmer 9 at the end of the filtration process, it will be more efficient in removing the microscopic impurities from the water since particulate matter and other flow-impeding substances were previously removed.

It is also to be understood that the following claims are intended to cover all of the generic and specific features of the invention as described herein, and all statements of the scope of the invention which, as a matter of language, might be said to fail therebetween.

Having described the invention, what is claimed as new and secured by Letters Patent is:

1. A filtration apparatus for filtering water in an aquarium comprising:
   a pre-filter comprising:
      an intake chamber;
      an intermediate chamber; and
      an outlet chamber having a filter therein;
   a biological filter located below said pre-filter having a biological chamber containing biological media that supports bacteria growth;

a bottom wall separating the pre-filter from the biological filter, said bottom wall having an aperture between the outlet chamber and the biological chamber;

a first partition wall located between the intake and intermediate chambers, and extending from an elevation higher than that of an additional partition wall located between the intermediate and outlet chambers, said first partition wall being spaced from said bottom wall;

an intake tube extending from outside the pre-filter to inside the intake chamber for flowing water from said aquarium to said intake chamber, the intake tube having an inlet and an outlet, the inlet being at an elevation lower than that of the intake chamber;

a water return tube; and pump means for pumping water from a lower region of said biological chamber through said water return tube into said aquarium, forcing a water level in said aquarium to become higher than a water level in said intake chamber, forcing water to flow through said intake tube into said intake chamber, below said first partition wall into said intermediate chamber, over said additional partition wall into said outlet chamber through said outlet chamber filter, through said aperture and back into said biological filter chamber, with the structure of the partition walls maintaining siphonability in said intake tube, both when the pump is operating, and when the pump is not operating.

2. The apparatus as in claim 1, wherein the intake chamber and the outlet chamber are open to atmosphere.

3. The apparatus as in claim 1, further comprising a protein skimmer and a venturi that directs a portion of the water to flow into the protein skimmer, the venturi being connected to the pump so that the protein skimmer is in fluid communication with the pump only via the venturi.

4. The apparatus as in claim 3, wherein the protein skimmer contains a device that aerates the portion of the water within the protein skimmer at an elevation beneath a top of the protein skimmer, the device aerating by causing formation of bubbles within the portion of the water that become coated with proteinaceous and other organic solvent materials within the portion of the water as the bubbles float upwardly towards the top of the protein skimmer.

5. The apparatus as in claim 4, further comprising a secondary water return tube that directs return of the portion of the water from the top of the protein skimmer.

6. The apparatus as in claim 1, further comprising a housing containing the pre-filter and the filter, the pre-filter being removable from the housing.

7. The apparatus as in claim 1, further comprising a housing that houses the intake chamber, the outlet chamber and the biological chamber; and mounting elements that are configured and arranged to mount the housing to a sidewall of the aquarium.

8. A method of filtering water in an aquarium comprising the steps of:

(i) providing a filtration apparatus comprising:
    a pre-filter comprising:
    an intake chamber;
    an intermediate chamber; and
    an outlet chamber having a filter therein;

a biological filter located below said pre-filter having a biological chamber containing biological media that supports bacteria growth;

a bottom wall separating the pre-filter from the biological filter, said bottom wall having an aperture between the outlet chamber and the biological chamber;

a first partition wall located between the intake and intermediate chambers, and extending from an elevation higher than that of an additional partition wall located between the intermediate and outlet chambers, said first partition wall being spaced from said bottom wall;

an intake tube extending from outside the pre-filter to inside the intake chamber for flowing water from said aquarium to said intake chamber, the intake tube having an inlet and an outlet, the inlet being at an elevation lower than that of the intake chamber;

a water return tube; and (ii) circulating water from an aquarium through said filtration apparatus, and then returning the water to the aquarium, wherein water is circulated from a lower region of said biological chamber through said water return tube into said aquarium, forcing a water level in said aquarium to become higher than a water level in said intake chamber, forcing water to flow through said intake tube into said intake chamber, below said first partition wall into said intermediate chamber, over said additional partition wall into said outlet chamber through said outlet chamber filter, through said aperture and back into said biological filter chamber, maintaining siphonability in said intake tube, both when the water is circulating, and when the water is not circulating.

9. The method as in claim 8, wherein the intake chamber and the outlet chamber are open to atmosphere.

10. The method as in claim 8, further comprising the step of directing a portion of the water with a venturi to a protein skimmer.

11. The method as in claim 10, further comprising aerating the portion of the water with a device within the protein skimmer at an elevation beneath a top of the protein skimmer, the aerating causing formation of bubbles within the portion of the water that become coated with proteinaceous and other organic solvent materials within the portion of the water as the bubbles float upwardly towards the top of the protein skimmer.

12. The method as in claim 11, further comprising returning the portion of the water at the top of the protein skimmer to the aquarium through a secondary water return tube.

13. The method as in claim 8, further comprising housing the pre-filter and the filter, further comprising the step of removing the pre-filter from the housing and thereafter returning the pre-filter to the housing.

14. The method as in claim 8, further comprising housing the intake chamber, outlet chamber and biological chamber by a housing and mounting the housing to a sidewall of the aquarium with mounting elements configured and arranged to effect such mounting.

* * * * *